Jan. 1, 1935.  W. F. SKINNER  1,986,541
TOY MOVING PICTURE CAMERA
Filed Nov. 7, 1932
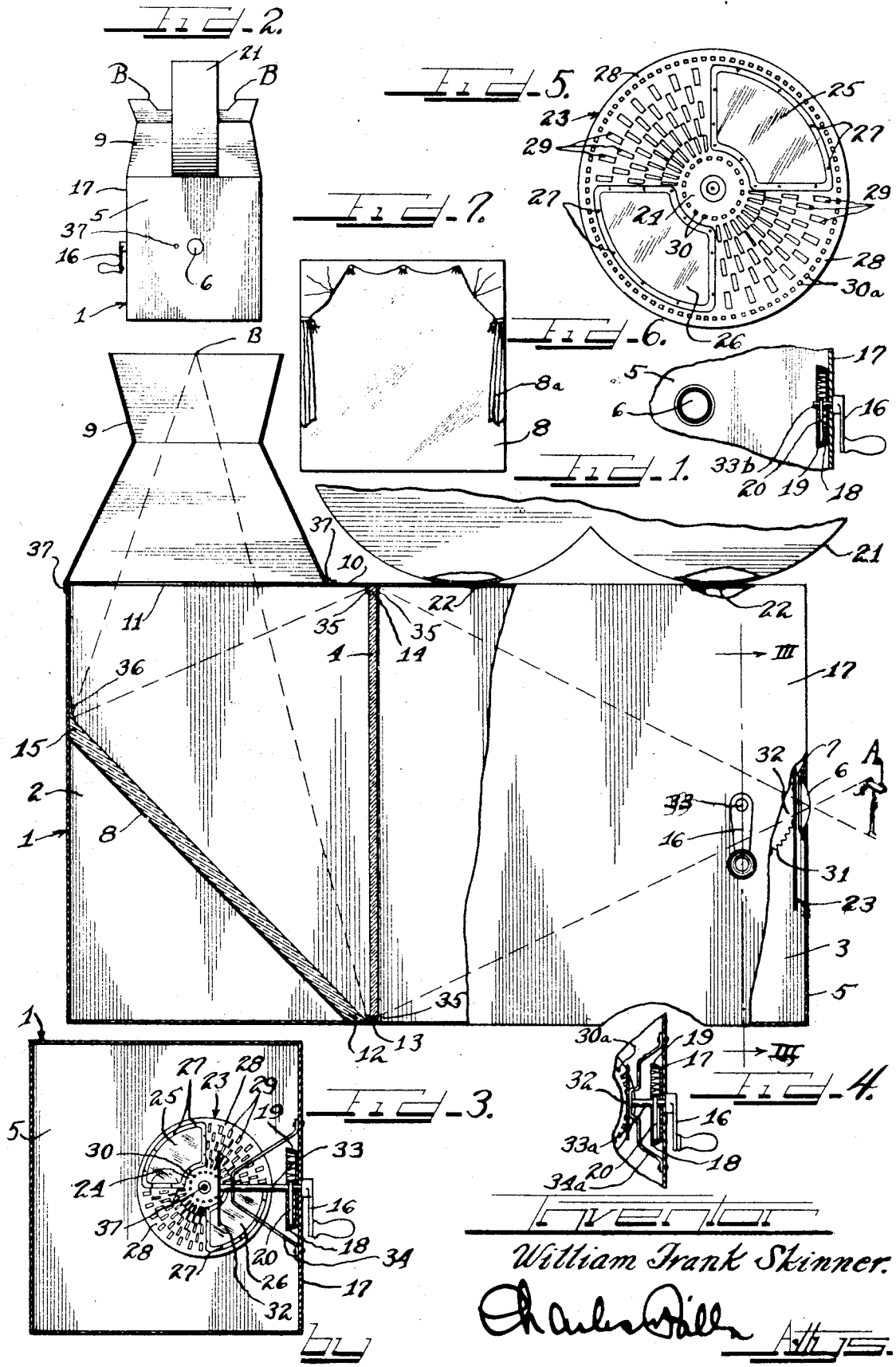
Inventor
William Frank Skinner Patented Jan. 1, 1935

1,986,541

UNITED STATES PATENT OFFICE 1,986,541

TOY MOVING-PICTURE CAMERA

William Frank Skinner, Miami, Fla., assignor of six-tenths to Gail E. Chandler, Miami, Fla.

Application November 7, 1932, Serial No. 641,594

11 Claims. (Cl. 88—16.4)

This invention has to do with toys and is concerned more particularly with a toy moving picture camera.

It is an object of the invention to provide a camera of this type which is of simple construction, consisting of few parts whereby the same may be constructed at a low cost of manufacture and sold cheaply.

It is another object of the invention to provide a camera of this character which will resemble, externally, a commercial moving picture camera, both in appearance and in the method of use by the operator.

Another object of the invention resides in the provision of a toy moving picture camera which will enable the operator to view objects in motion in natural or in any desired colors, or in a flickering light, together with handle operated means for producing a clicking sound as the handle is rotated.

A further object of the invention resides in a toy moving picture camera which may be conveniently held in one hand and cranked by the other while the operator views images, either still or moving, right-side up through the camera.

In accordance with the general features of the invention, there is provided a box-like structure having two main compartments separated by a partition in the form of a piece of ground glass. In one of the partitions on the side directly opposite the partition, is a lens which allows light to enter the compartment, throwing an inverted image upon the partition. In the other compartment is a mirror arranged at a suitable angle such as 45°, and a hood for receiving the eye of the observer is arranged to receive the reflection from said mirror, the image being right-side up, or erect. A crank is arranged on one side of the box-like structure and clicking mechanism is associated therewith, so that as the handle is turned, the sensation of taking actual motion pictures is received. Means controlled by the handle is provided to color the light entering through the lens, said means including transparent and semi-opaque portions which may be rotated at sufficient speed to provide a flickering effect to the eye similar to that experienced in the actual taking of motion pictures. To complete the similarity with a commercial moving-picture camera, a pair of disc-like members in tandem is secured to the upper side of the box-like structure giving the impression of the provision of motion picture reels. The mirror employed may be plane or curved, as desired.

Other and further important objects of this invention will be apparent from the disclosures in the specification and the accompanying drawing.

This invention (in preferred forms) is illustrated in the drawing and hereinafter more fully described.

On the drawing:

Figure 1 is an upright view, partly in section and partly in elevation, showing a toy moving-picture camera constructed in accordance with the principles of the present invention.

Figure 2 is a front elevational view, of reduced size, of the structure shown in Figure 1.

Figure 3 is a transverse sectional view taken approximately in the plane designated by the line III—III in Fig. 1.

Figure 4 is a fragmentary view similar to Figure 3 but showing a modified form of the invention.

Figure 5 is an enlarged elevational view of a disc combining the features of the discs appearing in elevation in Figure 3 and fragmentarily in elevation in Figure 4.

Figure 6 is a view similar to Figure 4 but showing another form of the invention.

Figure 7 is an elevation of the mirror used in the invention.

Referring now more particularly to the drawing, the invention is presented for illustrative purposes only in the form of a box-like structure 1 which may be made of sheet metal as shown or of any other suitable material having the desired characteristics, such as wood or fiber. The box 1 is divided into two main compartments 2 and 3, separated by a partition 4 of ground glass. The relative sizes of the compartments 2 and 3 may be varied as desired, the forward compartment 3 being here illustrated as somewhat longer than the rear compartment 2.

In the forward wall 5 of the front compartment 3, a lens 6 is preferably substantially centrally located, said lens being held in place in any suitable manner as by a ring 7 applied to the inside surface of the wall 5 and providing with said wall a circumferential recess for receiving the marginal portion of the lens 6. Light from exterior objects such as the object A and passing through the lens 6 is thrown upon the ground glass partition 4, which acts as a screen, the image being inverted. The lens is preferably of the fused type in the interest of a low cost of manufacture.

The other main compartment 2 contains a mirror 8 arranged at 45° to the screen or ground glass 4 and has its reflecting surface facing said glass 4 and also facing the upper part of the box 1. An eye hood 9 of Venturi-shape simulating an eye hood used in moving-picture and other cameras is positioned over the top wall 10 of the compartment 2. The wall 10 is provided with an opening 11 of such size and so arranged that when the eyes are positioned in the hood 9 with the camera in front of the observer, as at BB, the entire mirror 8, and preferably nothing but the mirror 8, will be visible. The base 12 of the mirror 8 is arranged at the foot 13 of the ground glass 4, and the arrangement is such that when the eyes are positioned at B, the portion of the image at the top 14 of the ground glass 4 is reflected by the upper margin 15 of the mirror 8, and the portions of the images appearing at the upright margins of the glass 4 are reflected from the corresponding margins of the mirror 8, to the eyes at B. Although the image on the ground glass 4 is inverted, the same is reflected by the mirror 8 so that it appears erect when viewed from the eye hood 9.

With the construction thus far described, objects such as the object A which are viewed by means of this toy camera will appear in their true colors, whether still or in motion, and whether the camera is still or in motion.

In order that the child amusing himself with this camera may experience the thrill of operating a moving-picture camera, a handle is located on the outside of the box 1 and means operating in conjunction with the handle serve to provide a clicking sound as the handle is rotated. To this end, the handle 16 is mounted on one side, such as the right-hand side 17 of the box 1 on a suitably supported or journalled spindle in a manner which will be more fully described in accordance with the different forms of the invention.

A substantially cup-shaped member such as a sheet metal bottle cap 18 is secured to the inner surface of the wall 17 as shown in Figures 3 and 4, in coaxial relation to the spindle, the peripheral portion 19 being corrugated. The spindle carries a flexible pawl 20 of such length that its free end fits into each corrugation selectively and clicks as it is moved from corrugation to corrugation in response to rotation of the handle 16 and serves as a brake to yieldingly restrain movement of the spindle in one direction and positively prevent movement thereof in the opposite direction.

To carry out the similarity to a commercial or actual moving-picture camera, a pair of Siamese twin cylindrical dummy reel cartridges are arranged as shown at 21. This structure may be formed in any suitable manner, and if made of sheet metal as shown, is preferably provided with struck-out portions such as the tongues 22 which pass through corresponding openings in the top wall of the box 1 and are return-bent to thereby interlock the cartridges with the top of the box 1. If desired, the structure at 21 could be secured to the box 1 by soldering, riveting, or in any other suitable way.

It may be desirable to provide means making it possible in the use of this toy camera to view objects through a medium colored red, green or otherwise, and it may also be desirable to provide a flickering view of objects whose light passes through the lens 6, in conjunction with clicking to thereby give the child practically a complete sensation of operating a real moving-picture camera.

To these ends, there is provided a disc 23 which comprises preferably a hub 24 and two substantially quadrant-shaped openings between the hub and the outer marginal portion of the disc. These openings are closed by preferably transparent sheets of some suitable material such as celluloid as shown at 25 and 26. The sheets 25 and 26 are secured to the disc 23 in any suitable manner as by rivets or eyelets 27. The portions 28 of the disc between the sheets 25 and 26 are provided with a plurality of openings 29 whereby said portions are rendered substantially semi-opaque. The sheets 25 and 26 may be suitably colored; for example, the sheet 25 could be red and the sheet 26, green. By locating one or the other of the sheets 25 and 26 directly behind the lens 6, the image visible at B will be correspondingly colored.

The disc 23 is provided at its hub with a circumferential series of holes 30 arranged to drivably receive the cogs 31 of a gear or wheel 32 mounted on the spindle or shaft 33 carrying the handle 16 in Figures 1 and 3. It will be noted that the spindle 33 passes through a bearing bracket 34 adjacent one end and through the side wall 17 which also serves as a bearing, thereby properly supporting the spindle 33 so that when the same is rotated by the handle 16, the disc 23 is caused to rotate, presenting alternately a semi-opaque portion 28 of the disc behind the lens 6, and a transparent colored sheet 25 or 26, as the case may be.

When the child's eyes are at B and the box-like structure 1 is supported in one hand and the handle 16 rotated with the other hand, a clicking sound, due to the engagement of the pawl 20 with the corrugations 19, is heard, and at the same time, a flickering image is seen due to the semi-opaque and transparent colored sheets 25, 26 and 28 alternately moving across the path of light passing through the lens 6 and directed toward the ground glass 4. While the colors of the sheets 25 and 26 may be varied as desired, they are preferably complementary such as red and green, respectively, so that when the disc 23 is rotated at a sufficiently rapid rate, the resultant color sensation received at B will be approximately the natural color of the object or objects except that a flickering light will result, thereby strongly simulating the moving picture effect. If desired, the handle 16 may be rotated sufficiently to present one or the other color behind the lens 6, and every object whose image is visible in the hood 9 will have its colors correspondingly modified. While in such event, the handle 16 would not be turned and therefore no clicking sound could thus be obtained, it is well within the province of this invention to provide a separate adjustment for the disc 3 when it is desired to color all objects without obtaining the flickering effect, in which case the disc 23 could be retained in the desired relation to the lens 6 and at the same time the clicking sound could be provided for.

In the form of the invention appearing in Figure 4, the only change made is in employing a disc which is substantially identical with the disc 23, but which is provided with holes 30a at its outer periphery, and the spindle 33a is correspondingly shortened and the bearing bracket 34a correspondingly fashioned, the gear 32 in such event being arranged in driving relation to the holes 30a. Such a construction would be provided if it were found desirable to rotate the disc 23a at a slower rate of speed, for a given rate of rotation of the handle 16.

In the form of the invention appearing in Figure 6, the disc and driving instrumentalities could be omitted, where it is desired to provide the clicking sound without the accompaniment of a flicker in the image. Such a construction would obviously sell for a lower price than that previously described, and the lens 6 could be of any desired color to correspondingly modify the colors of the objects as the images reach the eye.

The discs may be made as shown in Figure 5, having holes for cooperating with the driving gear 32 both at the hub 24 and at the outer periphery 28 so that such discs may be used interchangeably with the fast drive shown in Figure 3 and the slow drive shown in Figure 4.

The mirror 8 may be plane or convex or concave, according as it may be desired to provide a correct or an enlarged or reduced and distorted image. With a view to further completing the illusion of taking actual motion-pictures, the mirror 8 could have a design 8ª of a curtain painted or pasted on its upper surface. Such curtain, if pasted, could be of paper or fabric arranged in a preferably narrow strip and forming a border for the side and upper margins of the mirror 8.

As has been pointed out, the box-like structure 1 may be made of any suitable material, and is here shown for illustrative purposes only as made of sheet metal. The ground glass 4 is held in position by tongues 35 which are struck out from the walls of the box 1 so as to straddle the ground glass 4 as shown in Figure 1. A separate anchoring piece 36 is soldered or otherwise suitably secured to the rear wall of the compartment 2 above the upper end 15 of the mirror 8 to hold the same at the proper angle with respect to the ground glass 4. The hood 9 is provided with suitable flanges 37 which are soldered or otherwise suitably secured to the box 1, although said hood 9 could be provided with struck-out portions interlocked with the box 1 in a manner similar to those shown at 22.

The disc 23 is supported on an arbor 37 which extends from the front wall 5 of the box 1, as seen in Figure 3.

It will be observed in view of the foregoing that the partition, while preferably made of ground glass, may be of any other translucent material having substantially the image-fixing property of ground glass.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A toy moving picture camera affording means for viewing indirectly erect images, said means including a lens, a ground glass substantially parallel to the lens, an inclined mirror between which and the lens said glass is positioned, a member positioned between the lens and said glass and provided with different colored transparent portions, and means for adjusting said member to position any of said portions selectively directly behind said lens, whereby the colors of the images may be modified as desired.

2. A toy moving picture camera comprising a box-like structure having a lens in a wall thereof, means affording a view of images formed by said lens, a member positioned between the lens and said means and provided with transparent portions in complementary colors, and a device for adjusting said member to position said portions selectively directly behind said lens, to thereby modify the images in accordance with the color desired, said device including means associated with said member for causing said portions to be positioned directly behind said lens alternately with sufficient rapidity to afford a resultant image in substantially natural colors, said member being relatively opaque between said transparent portions whereby upon rapid movement of said member, a flickering image in natural colors is afforded.

3. A toy moving picture camera comprising a box-like structure having a lens and means for projecting erect images of objects whose light passes through said lens, a disc rotatively mounted in said structure and arranged to overlie substantially the entire lens, and means drivably associated with said disc and including an operating handle, said disc having alternate transparent and relatively opaque portions, said transparent portions being complementarily colored, all of said portions being arranged to be positioned directly behind said lens alternatively as said disc is rotated, said handle being operable for the purpose of adjustment to position any one of said portions selectively behind said lens to correspondingly modify the colors of the images, said handle being operable to rotate the disc with sufficient rapidity to cause said complementarily colored portions to blend to a substantially white light whereby said disc will cause a flickering image in substantially natural colors.

4. A toy moving picture camera comprising a box-like structure having a lens and means for projecting erect images of objects whose light passes through said lens, a disc rotatively mounted in said structure eccentrically to said lens and arranged to overlie said lens, a shaft carried by said structure, means associated with said shaft and disc and providing a driving connection therebetween, said shaft projecting to the outside of said structure, an operating handle connected to the projecting portion of said shaft, said disc having alternating transparent and semi-opaque portions, said transparent portions being complementarily colored, all of said portions being arranged to be positioned directly behind said lens alternatively as said disc is rotated, said handle being operable to position any one of said portions selectively behind said lens to correspondingly modify the image, said handle being also operable to rotate the disc with sufficient rapidity to cause said complementarily colored portions to blend to a substantially white light whereby said disc will cause a flickering image in substantially natural colors, a plurality of teeth arranged coaxial with said shaft, and a pawl for cooperating with said teeth, said teeth and pawl being relatively yieldable and said pawl being engageable with said teeth in succession as said handle is rotated to afford a clicking sound.

5. A toy moving picture camera comprising a box-like structure having a lens and means for projecting erect images of objects whose light passes through said lens, a disc rotatively mounted in said structure eccentrically to said lens and arranged to overlie said lens, a shaft carried by said structure, means associated with said shaft and disc and providing a driving connection therebetween, said shaft projecting to the outside of said structure, an operating handle connected to the projecting portion of said shaft, said disc having alternating transparent and relatively opaque sector portions, said transparent portions being complementarily colored, all of said portions being arranged to be positioned directly behind said lens alternatively as said disc is rotated, said handle being operable to position any one of said portions selectively behind said lens to correspondingly modify the image, said handle being also operable to rotate the disc with sufficient rapidity to cause said complementarily colored portions to blend to a substantially white light whereby said disc will cause a flickering image in substantially natural colors, all of the instrumentalities employed in driving said disc being arranged out of the path of light entering said structure through said lens.

6. A toy moving picture camera comprising a box-like structure having a lens in a wall thereof, means affording a view of images formed by said lens, a member positioned between the lens and said means and provided with transparent portions in complementary colors, and a device for adjusting said member to position said portions selectively directly behind said lens, to thereby modify the images in accordance with the color desired, said device including means associated with said member for causing said portions to be positioned directly behind said lens alternately with sufficient rapidity to afford a resultant image in substantially natural colors.

7. A toy moving picture camera comprising a box-like structure having a lens and means for projecting erect images of objects whose light passes through said lens, a disc rotatively mounted in said structure and arranged to overlie substantially the entire lens, means drivably associated with said disc and including an operating handle, said disc having alternate transparent and relatively opaque portions, said transparent portions being complementarily colored, all of said portions being arranged to be positioned directly behind said lens alternatively as said disc is rotated, said handle being operable for the purpose of adjustment to position any one of said portions selectively behind said lens to correspondingly modify the colors of the images, said handle being operable to rotate the disc with sufficient rapidity to cause said complementarily colored portions to blend to a substantially white light whereby said disc will cause a flickering image in substantially natural colors, and means operable by said handle to afford a clicking sound.

8. A toy moving picture camera comprising a box-like structure having a lens and means for projecting erect images of objects whose light passes through said lens, a disc rotatively mounted in said structure and arranged to overlie substantially the entire lens, means drivably associated with said disc and including an operating handle, said disc having alternate transparent and relatively opaque portions, said transparent portions being complementarily colored, all of said portions being arranged to be positioned directly behind said lens alternatively as said disc is rotated, said handle being operable for the purpose of adjustment to position any one of said portions selectively behind said lens to correspondingly modify the colors of the images, said handle being operable to rotate the disc with sufficient rapidity to cause said complementarily colored portions to blend to a substantially white light whereby said disc will cause a flickering image in substantially natural colors, and means operable by said handle to afford a clicking sound, all of said means being positioned out of the path of light entering the structure through the lens.

9. A toy moving picture camera comprising a box-like structure having a lens and affording a view of images formed by said lens, a member provided with transparent portions in complementary colors, instrumentalities for adjusting said member to position said portions selectively so as to modify the images in accordance with the color desired, said instrumentalities being operable so as to cause said portions to be so positioned alternately with sufficient rapidity to afford a resultant view in substantially natural colors.

10. A toy moving picture camera comprising a box-like structure having a lens and affording a view of images formed by said lens, a member provided with transparent portions in complementary colors, instrumentalities for adjusting said member to position said portions selectively so as to modify the images in accordance with the color desired, said instrumentalities being operable so as to cause said portions to be so positioned alternately with sufficient rapidity to afford a resultant view in substantially natural colors, said member being relatively opaque between said transparent portions whereby upon rapid movement of said member, a flickering image in natural colors is afforded, said instrumentalities being constructed so as to provide a clicking sound during such operation thereof, whereby to impart to the child amusing himself with the camera the sensation of taking actual moving pictures.

11. A toy moving picture camera comprising a box-like structure having a lens and affording a view of images formed by said lens, a member provided with transparent portions in complementary colors, instrumentalities for adjusting said member to position said portions selectively so as to modify the images in accordance with the color desired, said instrumentalities being operable so as to cause said portions to be so positioned alternately with sufficient rapidity to afford a resultant view in substantially natural colors, and being constructed to provide a clicking sound during such operation thereof whereby to impart to the child amusing himself with the camera the sensation of taking actual moving pictures.

WILLIAM FRANK SKINNER.